United States Patent
Roesler et al.

[11] Patent Number: 5,932,652
[45] Date of Patent: Aug. 3, 1999

[54] AQUEOUS POLYURETHANE/UREA DISPERSIONS CONTAINING ALKOXYSILANE GROUPS

[75] Inventors: Richard R. Roesler, Wexford, Pa.; Lutz Schmalstieg, Cologne, Germany; Lyuba K. Gindin, Pittsburgh, Pa.

[73] Assignees: Bayer Corporation, Pittsburgh, Pa.; Bayer Aktiengesellschaft, Leverkusen, Germany

[21] Appl. No.: 08/992,163

[22] Filed: Dec. 17, 1997

[51] Int. Cl.$^6$ .............. C08J 3/00; C08K 3/20; C08L 75/00; C08L 83/00
[52] U.S. Cl. .......... 524/839; 524/588; 524/591; 524/840; 524/837; 524/838; 528/28
[58] Field of Search ............. 524/588, 591, 524/839, 840, 837, 838; 528/28

[56] References Cited

U.S. PATENT DOCUMENTS

| | | | |
|---|---|---|---|
| 3,479,310 | 11/1969 | Dieterich et al. | 260/29.2 |
| 3,870,684 | 3/1975 | Witt et al. | 260/75 NH |
| 4,066,591 | 1/1978 | Scriven et al. | 260/29.2 TN |
| 4,092,286 | 5/1978 | Noll et al. | 260/29.2 TN |
| 4,108,814 | 8/1978 | Reiff et al. | 260/29.2 TN |
| 4,203,883 | 5/1980 | Hangauer, Jr. | 260/29.2 TN |
| 4,237,264 | 12/1980 | Noll et al. | 528/67 |
| 4,238,378 | 12/1980 | Markusch et al. | 260/29.2 TN |
| 4,408,008 | 10/1983 | Markusch | 524/591 |
| 5,041,494 | 8/1991 | Franke et al. | 524/588 |
| 5,354,808 | 10/1994 | Onwumere et al. | 524/837 |
| 5,554,686 | 9/1996 | Frisch, Jr. et al. | 524/588 |
| 5,756,751 | 5/1998 | Schmalstieg et al. | 524/110 |

*Primary Examiner*—Patrick D. Niland
*Attorney, Agent, or Firm*—Joseph C. Gil; Thomas W. Roy

[57] ABSTRACT

The present invention relates to aqueous polyurethane/urea dispersions wherein the polyurethane/ureas contain 0.5 to 6% by weight, based on the weight of the polyurethane/ureas, of alkoxysilane groups (calculated as Si, MW 28), which have been incorporated by the reaction of isocyanate groups with compounds containing alkoxysilane groups and aspartate groups.

The present invention also relates to a process for preparing these aqueous polyurethane/urea dispersions and to coatings prepared from these aqueous polyurethane/urea dispersions.

9 Claims, No Drawings

AQUEOUS POLYURETHANE/UREA DISPERSIONS CONTAINING ALKOXYSILANE GROUPS

BACKGROUND OF THE INVENTION

1. Field of the Invention

The present invention relates to aqueous polyurethane/urea dispersions containing alkoxysilane groups incorporated through aspartate groups, to a process for preparing these dispersions and to their use for the production of coatings which have improved properties, such as solvent resistance.

2. Description of the Prior Art

The production of linear or cross-linked aqueous polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat. Nos. 3,870,684, 4,203,883 and 4,408,008, which disclose cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers.

Regardless of the property level which may be obtained for coatings prepared from commercial polyurethane-urea dispersions, there is always a further need to increase these properties, in particular water resistance, solvent resistance, weather resistance and physical properties such as abrasion resistance.

It is an object of the present invention to provide aqueous polyurethane/urea dispersions which can be used to prepare coatings which possess these properties and still retain the other valuable properties of aqueous polyurethane dispersions.

This object may be achieved in accordance with the present invention by preparing the aqueous polyurethane/urea dispersions which contain alkoxysilane groups incorporated through aspartate groups.

Aqueous polyurethane dispersions containing alkoxysilane groups are known and disclosed, e.g., in U.S. Pat. Nos. 5,041,494, 5,354,808 and 5,554,686. However, in these applications the alkoxysilane groups are not incorporated through aspartate groups as required by the present invention. An advantage of incorporating the alkoxysilane groups in accordance with the present invention is that stable dispersions can be obtained at higher siloxane group contents than when the siloxane groups are incorporated through primary amino groups.

SUMMARY OF THE INVENTION

The present invention relates to aqueous polyurethane/urea dispersions wherein the polyurethane/ureas contain 0.5 to 6% by weight, based on the weight of the polyurethane/ureas, of alkoxysilane groups (calculated as Si, MW 28), which have been incorporated by the reaction of isocyanate groups with compounds containing alkoxysilane groups and aspartate groups.

The present invention also relates to a process for preparing these aqueous polyurethane/urea dispersions by A) preparing NCO prepolymers by reacting organic polyisocyanates with high molecular weight polyols, optionally low molecular weight isocyanate-reactive compounds and optionally isocyanate-reactive compounds containing hydrophilic groups and B) reacting the NCO prepolymers with compounds containing alkoxysilane groups and aspartate groups and optionally other amine chain extenders either prior to, during or after dispersing the NCO prepolymer in water, wherein the compounds containing alkoxysilane groups and aspartate groups are present in an amount sufficient to incorporate 0.5 to 6% by weight, based on the weight of the polyurethane/urea, of alkoxysilane groups (calculated as Si, MW 28).

Finally, the present invention relates to coatings prepared from these aqueous polyurethane/urea dispersions.

DETAILED DESCRIPTION OF THE INVENTION

In accordance with the present invention the term "polyurethane/urea" means polymers containing urethane and/or urea groups.

The aqueous polyurethane/urea dispersions according to the invention may be prepared by either a one-step or a two-step process, preferably by a two-step process. In the one-step process all of the components are mixed together and reacted in one step. In the two-step process an NCO prepolymer is formed in the first step and is subsequently reacted with a compound containing an alkoxysilane group and an aspartate group and optionally a low molecular weight, isocyanate-reactive chain extender in the second step to form the polyurethane/urea either before, during or after being mixed with an aqueous medium. The NCO prepolymer is preferably prepared by reacting an organic polyisocyanate with a high molecular weight polyol, an isocyanate-reactive compound containing hydrophilic groups and optionally a low molecular weight polyol.

The polyurethane/ureas may be dispersed in water by either the inverse process or the direct process. In the direct process water is added to the polymer to initially form a water-in-oil emulsion, which after passing through a viscosity maximum, is converted into an oil-in-water emulsion. In the inverse process the polymer is added to water, which avoids the need to pass through the viscosity maximum.

Even though more energy is required for preparing a dispersion by the direct process, it may be necessary to use this process if the viscosity of the polymer is too high to add it to water. A high viscosity polymer is often obtained when a fully reacted polyurethane/urea is prepared in the organic phase, especially when large amounts of solvent are not used to reduce the viscosity.

To obtain a suitable viscosity for using the inverse process without the use of large amounts of solvent, the NCO prepolymer can be dispersed in water and then reacted with the compound containing an alkoxysilane group and an aspartate group and optionally with an amine chain extender.

In addition to the one-step process in which all of the components are reacted to form the polyurethane/urea in one step and the preferred two-step process previously set forth, it is also possible to incorporate the compounds containing alkoxysilane groups and aspartate groups into the NCO prepolymers, which are then chain extended with polyamine chain extenders or crosslinking agents in known manner.

Any of the known starting materials for preparing polyurethane/urea dispersions may be used for preparing the dispersions according to the invention, provided that sufficient isocyanate groups are reacted with compounds containing alkoxysilane groups and aspartate groups to obtain the required alkoxysilane group content.

Suitable compounds containing alkoxysilane groups and aspartate groups include those corresponding to formula I

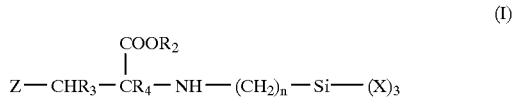

wherein
X represents identical or different organic groups which are inert to isocyanate groups below 100° C., provided that at least one of these groups is an alkoxy or acyloxy group,
Z represents $COOR_1$ or an aromatic ring,
$R_1$ and $R_2$ are identical or different and represent organic groups which are inert to isocyanate groups at a temperature of 100° C. or less,
$R_3$ and $R_4$ are identical or different and represent hydrogen or organic groups which are inert to isocyanate groups at a temperature of 100° C. or less and
n is an integer from 1 to 8.

The compounds of formula I are known and disclosed in U.S. Pat No. 5,364,955, which is herein incorporated by reference. They may be prepared by reacting aminoalkyl alkoxysilanes corresponding to the formula I with maleic, fumaric or cinnamic acid esters corresponding to the formula

In formulas I to II
X represents identical or different organic groups which are inert to isocyanate groups below 100° C., provided that at least one of these groups is an alkoxy or acyloxy group, preferably alkyl or alkoxy groups having 1 to 4 carbon atoms, more preferably alkoxy groups;
Z represents $COOR_1$ or an aromatic ring, preferably $COOR_1$,
$R_1$ and $R_2$ are identical or different and represent organic groups which are inert to isocyanate groups at a temperature of 100° C. or less, preferably alkyl groups having 1 to 9 carbon atoms, more preferably methyl, ethyl or butyl groups
$R_3$ and $R_4$ are identical or different and represent hydrogen or organic groups which are inert towards isocyanate groups at a temperature of 100° C. or less, preferably hydrogen and
n is an integer from 1 to 8, preferably 2 to 4 and more preferably 3.

Especially preferred are compounds in which X represents methoxy, ethoxy groups or propoxy groups, more preferably methoxy or ethoxy groups and most preferably methoxy groups, and n is 3.

Examples of suitable aminoalkyl alkoxysilanes of formula II include 2-aminoethyl-dimethylmethoxysilane; 6-aminohexyl-tributoxysilane; 3-aminopropyl-trimethoxysilane; 3-aminopropyl-triethoxysilane; 3-aminopropyl-methyidiethoxysilane; 5-aminopentyl-trimethoxysilane; 5-aminopentyl-triethoxysilane and 3-aminopropyl-triisopropoxysilane. 3-aminopropyl-trimethoxysilane and 3-aminopropyl-triethoxysilane are particularly preferred.

Examples of optionally substituted maleic, fumaric or cinnamic acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; the methyl, ethyl and butyl esters of cinnamic acid; and the corresponding maleic, fumaric and cinnamic acid esters substituted by methyl in the 2- and/or 3-position. The dimethyl, diethyl and dibutyl esters of maleic acid are preferred, while the diethyl and dibutyl esters are especially preferred.

The reaction of primary amines with maleic, fumaric or cinnamic acid esters to form the aspartates of formula I is known and described, e.g. in EP-A-0,403,921; DE-OS 1,670,812; and DE-OS 2,158,945. While none of these publications suggests the reaction of alkoxysilane-functional amines with maleic or fumaric acid esters, this reaction is described in U.S. Pat. No. 5,364,955. The preparation of the aspartates may be carried out, for example, at a temperature of 0 to 100° C. using the starting materials in such proportions that at least 1, preferably 1, olefinic double bond is present for each primary amino group. Excess starting materials may be removed by distillation after the reaction. The reaction may be carried out with or without a solvent, but the use of a solvent is less preferred. If a solvent is used, dioxane is an example of a suitable solvent. The compounds of formula III are colorless to pale yellow.

The compounds containing alkoxysilane groups and aspartate groups are present in an amount sufficient to incorporate a minimum amount of 0.5%, preferably 1.0% and more preferably 1.3% by weight, and a maximum amount of 6%, preferably 4% and more preferably 3% by weight, of alkoxysilane groups (calculated as Si, MW 28), wherein the percentages are based on the weight of the polyurethane/ureas.

Suitable polyisocyanates which may be used to prepare the polyurethane/ureas are known and include organic diisocyanates represented by the formula, $R(NCO)_2$, in which R represents an organic group obtained by removing the isocyanate groups from an organic diisocyanate having a molecular weight of from about 112 to 1,000, preferably from about 140 to 400. Diisocyanates preferred for the process according to the invention are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof. Polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used.

Preferred diisocyanates bis-(4-isocyanatocyclohexyl)-methane, 1,6-hexamethylene diisocyanate and isophorone diisocyanate, especially bis-(4-isocyanatocyclohexyl)-methane and isophorone diisocyanate.

Organic compounds containing at least two isocyanate-reactive groups, which may be reacted with the previously described organic diisocyanates to prepare the NCO prepolymers, can be divided into two groups, i.e., high molecular weight compounds having molecular weights from 400 to about 6,000, preferably from 800 to about 3,000, and low molecular weight compounds (chain extenders) having molecular weights below 400. The molecular weights are number average molecular weights ($M_n$) and are determined by end group analysis (OH number). Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. The polyesters may also contain a portion of carboxyl end groups. Polyesters of lactones, e.g., ε-caprolactone or hydroxycarboxylic acids, e.g. ω-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diaryl-carbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Examples of these polyethers as well as suitable polyhydroxy polyacetals, polyhydroxy polyacrylates, polyhydroxy polyester amides, polyhydroxy polyamides and polyhydroxy polythioethers are disclosed in U.S. Pat. No. 4,701,480, herein incorporated by reference.

While the presence of the previously described high molecular weight polyols is optional, they are preferably used in amount of at least 5%, more preferably at least 10% by weight, based on the weight of the polyurethane/urea. The maximum amount of these polyols is preferably 85%, more preferably 75% by weight, based on the weight of the polyurethane/urea.

The low molecular weight isocyanate-reactive component having an average molecular weight of up to 400 is selected from the polyhydric alcohols, preferably dihydric alcohols, which have previously been described for the preparation of the polyester polyols and polyether polyols, and the low molecular polyamines, preferably diamines, which are described hereinafter. Also suitable are aldimines as disclosed in U.S. Pat. No. 5,569,706, herein incorporated by reference.

In addition to the above-mentioned components which are preferably difunctional in the isocyanate polyaddition reaction, monofunctional and even small portions of trifunctional and higher functional components generally known in polyurethane chemistry, such as trimethylolpropane, may be used in special cases in which slight branching of the NCO prepolymer or polyurethane/urea is desired. However, the NCO prepolymers should be substantially linear and this may be achieved by maintaining the average functionality of the prepolymer starting components below about 2.1.

In order to enable the polyurethane/urea to be stably dispersed in an aqueous medium, ionic or potential ionic groups and/or lateral or terminal, hydrophilic ethylene oxide units are chemically incorporated into the polyurethane/urea. The ionic or potential ionic groups may be either anionic or cationic, preferably anionic. Examples of anionic groups include carboxylate and sulfonate groups, while examples of cationic groups include ammonium and sulfonium groups. The ionic groups are incorporated in an amount sufficient to provide an ionic group content of 0 to 200 milliequivalents per 100 g of polyurethane/urea. When the ionic or potential ionic groups are incorporated, they are preferably incorporated in an amount sufficient to provide an ionic group content of at least 10, preferably at least 20 milliequivalents per 100 g of polyurethane/urea. The upper limit for the content of ionic groups is preferably 180, more preferably 100 milliequivalents per 100 g of polyurethane/urea.

The content of hydrophilic ethylene oxide units may be up to about 10%, preferably up to about 8%, more preferably about 1 to 6% and most preferably about 2 to 6%, by weight, based on the weight of the polyurethane/urea. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The ionic or potential ionic groups may be chemically incorporated into the NCO prepolymer or may be chemically incorporated through the chain extender which is used to form the polyurethane/urea from the prepolymer. Suitable compounds for incorporating these groups include i) monoisocyanates or diisocyanates which contain ionic or potential ionic groups and ii) compounds which are monofunctional or difunctional in the isocyanate-polyaddition reaction and contain ionic or potential ionic groups.

The ionic groups are formed by neutralizing the corresponding potential ionic groups either prior to, during or after formation of the polyurethane/urea. When the potential ionic groups are neutralized prior to their incorporation into the polyurethane/urea, the ionic groups are incorporated directly. When neutralization is performed subsequent to forming the polyurethane/urea, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents and are also discussed hereinafter. Within the context of this invention, the term "neutralizing agents" is meant to embrace all types of agents which are useful for converting potential ionic groups to ionic groups.

The preferred carboxylate groups for incorporation into polyurethane/urea in either the one-step or two-step process are derived from hydroxy-carboxylic acids of the general formula:

(HO)$_x$Q(COOH)$_y$ wherein

Q represents a straight or branched, hydrocarbon radical containing 1 to 12 carbon atoms, and x and y represent values from 1 to 3.

Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

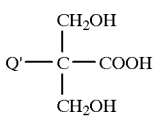

wherein Q' is hydrogen or an alkyl group containing 1 to 8 carbon atoms. The most preferred compound is α,α-dimethylol propionic acid, i.e., when Q' is methyl in the above formula.

When incorporating the anionic or potential anionic groups through the chain extender used to convert the NCO prepolymer to the polyurethane/urea in the second step of the two-step process, it is preferred to use amino functional compounds containing anionic or potential anionic groups such as the diamino carboxylic acids or carboxylates disclosed in U.S. Pat. No. 3,539,483 or salts of 2,6-diaminohexanoic acid. When sulfonate groups are desired they may be incorporated through the chain extenders using salts of isethionic acid or preferably diamino sulfonates of the formula

H$_2$N—A—NH—B—SO$_3$— wherein

A and B represent aliphatic hydrocarbon radicals containing 2 to 6 carbon atoms, preferably ethylene groups.

Whether the ionic groups are incorporated into the polyurethane/urea via the prepolymer or the chain extender is not critical. Therefore, the ionic groups may exclusively be incorporated via the prepolymer or via the chain extender or a portion of the ionic groups may be introduced according to each alternative. However, it is preferred to introduce the ionic groups via the prepolymer since this allows a wider range of process variations in preparing the polyurethane/urea dispersion.

Suitable compounds for incorporating the lateral or terminal, hydrophilic ethylene oxide units may be either monofunctional or difunctional in the context of the isocyanate-polyaddition reaction and include i) diisocyanates which contain lateral, hydrophilic ethylene oxide units, ii) compounds which are difunctional in the isocyanate-polyaddition reaction and contain lateral, hydrophilic ethylene oxide units, iii) monoisocyanates which contain terminal, hydrophilic ethylene oxide units, iv) compounds which are monofunctional in the isocyanate-polyaddition reaction and contain terminal, hydrophilic ethylene oxide units, and v) mixtures thereof.

Examples of these compounds are disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

In the two-step process the NCO prepolymers are prepared by reacting the polyisocyanate component with the high molecular weight organic component containing at least two isocyanate-reactive groups, optionally the low molecular weight organic component containing at least two isocyanate-reactive groups and optionally the compounds containing at least one ionic group, at least one potential ionic group or hydrophilic ethylene oxide units. The ratio of isocyanate groups to isocyanate-reactive groups is maintained between about 1.1 to 5, preferably about 1.2 to 3 and most preferably about 1.3 to 2.0 on an equivalent basis. The above components may be reacted simultaneously or sequentially to produce the NCO prepolymer.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 20%, preferably about 1 to 10% by weight, based on the weight of prepolymer solids.

The prepolymers may be prepared in the presence of solvent provided that the solvent is substantially nonreactive in the context of the isocyanate-polyaddition reaction. Examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

In addition to the preceding organic solvents, it is also possible to use silicon-containing reactive diluents as solvents during the production of the prepolymers and for the resulting coating compositions. Examples of these reactive diluents include tetramethoxy silane, tetraethoxy silane, methyl triethoxy silane, methyl trimethoxy silane, ethyl triethoxy silane, octyl triethoxy silane and dimethyl diethoxy silane.

The use of these reactive diluents provides two important benefits. First, the coating compositions contains less environmentally regulated organic solvent. Second, the reactive diluent is also a co-reactant for the polyurethane/urea dispersion and provides a composition with increased inorganic character. Coatings prepared from these compositions have different performance properties when compared to coatings prepared from compositions that do not contain these reactive diluents.

Suitable neutralizing or quaternizing agents for converting the potential anionic groups to anionic groups either before, during or after their incorporation into the polyurethane/ureas, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine. Suitable neutralizing agents for converting potential cationic groups to cationic groups are disclosed in U.S. Pat. Nos. 3,479,310 and 3,419,533, which are incorporated by reference.

A sufficient amount of the potential ionic groups must be neutralized so that when combined with the hydrophilic ethylene oxide units and optional external emulsifiers, the polyurethane/urea final product will be a stable dispersion. Generally, at least about 75%, preferably at least about 90%, of the potential ionic groups are neutralized to the corresponding ionic groups.

The conversion of the potential ionic groups to ionic groups is conducted in known manner, e.g., as described in the preceding patents setting forth suitable neutralizing agents.

The NCO prepolymers may be converted into aqueous polyurethane/urea dispersions in accordance with the methods known in polyurethane chemistry and described, e.g., in "Waterborne Polyurethanes," Rosthauser et al, Advances in Urethane Science and Technology, Vol. 10, pg. 121–162 (1987).

According to one process for preparing the polyurethane/urea dispersions, the NCO prepolymer is prepared, chain extended and/or chain terminated to form a polyurethane/urea and subsequently dispersed in water. This process is disclosed in U.S. Pat. No. 3,479,310, herein incorporated by reference.

When amines are reacted with the NCO prepolymer either as chain terminators or chain extenders, a preferred method of reacting with the NCO prepolymers with amino group-containing compounds is by dispersing the prepolymer in water and then reacting the prepolymer with the amino group-containing compounds, which may be mixed with water either before, during or after dispersing the NCO prepolymer. The amino group-containing compounds are preferably a mixture containing a) 5 to 100 mole percent, based on the moles of amino group-containing compounds, of one or more compounds containing an alkoxysilane group and an aspartate group and b) 0 to 90 mole percent, based on the moles of amino group-containing compounds, of amino group-containing compounds other than a).

Branching of the polyurethane/urea may be obtained by using compounds having an amine functionality of greater than 2 as component b).

In a preferred embodiment of the two-step process for preparing the aqueous polyurethane/urea dispersions of the present invention, the NCO prepolymers are reacted with components a) and b). While component b) may be selected from compounds containing one amino group, preferably component b) has an average amine functionality, i.e., the number of amine nitrogens per molecule, of about 2 to 6, more preferably about 2 to 4 and most preferably about 2 to 3. The desired functionalities can be obtained by using mixtures of polyamines.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain 1 to 30 carbon atoms, preferably 2 to 15 carbon atoms, and more preferably 2 to 10 carbon atoms. These polyamines may contain additional substitutents provided that they are not as reactive with isocyanate groups as the primary or secondary amines.

Examples of polyamines for use as component b) include those disclosed in U.S. Pat. No. 4,408,008, herein incorporated by reference. Preferred polyamines include ethylene diamine, 1,6-hexane diamine, 1,2-and 1,3-propane diamine, the isomeric butane diamines, 1-amino-3-aminomethyl-3,5, 5-trimethyl cyclohexane, bis-(4-aminocyclohexyl)-methane, bis-(4-amino-3-methylcyclohexyl)-methane, xylylene diamine, α,α,α',α'-tetramethyl-1,3- and/or -1,4-xylylene diamine, 1-amino-1-methyl-4(3)-aminomethyl cyclohexane, 2,4- and/or 2,6-hexahydrotoluylene diamine, hydrazine, diethylene triamine, triethylene tetramine, tetraethylene pentamine, pentaethylene hexamine.

Especially preferred are 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentaethylene hexamine.

The amount of amino group-containing compounds to be used in accordance with the present invention is dependent upon the number of isocyanate groups in the prepolymer. Generally, the ratio of isocyanate groups amino groups is 1.0:0.6 to 1.0:1.1, preferably 1.0:0.8 to 1.0:0.98 on an equivalent basis.

The reaction between the NCO prepolymer and the amino group-containing compounds is generally conducted at temperatures of 5 to 90° C., preferably 20 to 80° C., and more preferably 30 to 60° C. The weight, preferably 15 to 60% by weight and more preferably 30 to 45% by weight. However, it is always possible to dilute the dispersions to any minimum solids content desired. The average particle size of the polyurethane-ureas is generally below 1.0 micron, preferably 0.001 to 0.5 microns and more preferably 0.01 to 0.3 microns. The small particle size enhances the stability of the dispersed particles and also leads to the production of films with high surface gloss.

The dispersions may be blended with other dispersions or with other known additives such as fillers, plasticizers, pigments, carbon black, silica sols and the known levelling agents, wetting agents, antifoaming agents and stabilizers.

In order to improve the chemical resistance and hardness of the dispersions according to the invention, they may be blended with colloidal silica in amounts of up to 70% based on the weight of the resulting composition. The improvement is believed to be due to the fact that the colloidal silica contains polysilicon dioxide with Si—OH radicals on the surface of each particle. These Si—OH radicals can react with silanes so that a chemical bond exists between the inorganic modified organic matrix and the silica particle. It is believed that this imparts a character to the film, not unlike an elastomer, where hard domains are surrounded by a soft continuous phase. Suitable examples of colloidal silica include those having various particle sizes and surface treatments, such as sodium or ammonium hydroxide. Examples of surface treatments include alkali or acid washing. Alkali washing is preferred for polyurethane/ureas containing anionic groups and acid washing is preferred for polyurethane/ureas containing cationic groups.

The aqueous polyurethane/urea dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for The aqueous polyurethane/urea dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature. When the products are cured, water evaporates and the silane groups react with one another to form Si—O—Si linkages, which provide additional crosslinking. For this reason the molecular weight of the products does not have to as high as prior art products to attain similar performance levels. This means that the viscosity of the polyurethane/urea is lower, which means that higher solids products can be obtained or less solvent is necessary.

In the following examples all parts and percentages are by weight unless otherwise specified.

EXAMPLES

The following ingredients were used in the examples:
Polyol 1
A polyester diol prepared from 1,6-hexanediol, neopentyl glycol and adipic acid, number average molecular weight—1700, molar ratio of glycols 65:35.
Polyol 2
A polyester diol prepared from 1,6-hexanediol and adipic acid, number average molecular weight 840.
Polyol 3
A polyester diol having a molecular weight of 1016 (available as Fomrez 22-112 from Witco).
Polyol 4
A polyester diol obtained by the ring opening polymerization of $\epsilon$-caprolactone and having a number average molecular weight of 1250 (available as Tone 0230 from Union Carbide).
Polyol 5
A polytetramethylene ether glycol having a number average molecular weight of 1000 (available as Terethane 1000 from DuPont).
Polyol 6
A hexane diol polycarbonate having an equivalent weight of 1000.
Monool 1
A monohydroxy polyether prepared from n-butanol, ethylene oxide, and propylene oxide (in a molar ratio ethylene oxide to propylene oxide of 83:17), equivalent weight 2150.
Monool 2
A methanol-initiated monohydroxy polyether prepared from ethylene oxide and having an equivalent weight of 550.
Polyisocyanate 1
An polyisocyanate which contains allophanate groups and isocyanurate groups, is prepared from 1,6-hexamethylene diisocyanate and has an isocyanate content of 20.3%, a monoallophanate group content of 4.4%, a content of monomeric diisocyanate of <0.2% and a viscosity at 25° C. of about 1100 mPa·s (available from Bayer Corporation as Desmodur XP-7100).
Silane Aspartate 1
8.27 equiv. of 3-aminopropyltriethoxysilane were added to a 5 liter flask fitted with agitator, thermocouple, nitrogen inlet and addition funnel with condenser. 8.27 equiv. of dialkyl maleate were added dropwise through the addition funnel over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete.
Silane Aspartate 2
8.27 equiv of 3-aminopropyltrimethoxysilane were added to a 5 liter flask fitted with agitator, thermocouple, nitrogen inlet and addition funnel with condenser. 8.27 equiv of dialkyl maleate were added dropwise through the addition funnel over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete.

The following abbreviations were used in the examples:
Isocyanates:
  IPDI isophorone diisocyanate
  HMDI bis-(4-isocyanatocyclohexyl)-methane
  HDI 1,6-hexamethylene diisocyanate
Chain extenders:
  NPG neopentyl glycol
  BDO 1,4-butane diol
  EDA ethylene diamine
  HH hydrazine hydrate
  DETA diethylene triamine
Solubilizing agents:
  DMPA α,α-dimethylol propionic acid
  MDEA methyl diethanol amine
Catalyst:
  DBTDL dibutyltin dilaurate
  TEDA triethylene diamine (available as DABCO 33LV from Air Products)
Neutralizing agents:
  TEA: triethyl amine
Silane amines:
  SA1 silane aspartate 1
  SA2 silane aspartate 2
  APS 3-aminopropyltrimethoxysilane
Solvents:
  NMP N-methyl-2-pyrrolidinone
  MEK methyl ethyl ketone
Other:
  DBA dibutyl amine
  PUD polyurethane dispersion
  RS resin solids Preparation of Silane PUD 1

To a three neck flanged resin flask fitted with stirrer, nitrogen inlet, thermocouple and condenser were added 113 g (0.133 eq) of polyol 1 and 2.51 g (0.0012 eq) of monool 1. This mixture was melted at 80° C. To the molten mixture was added 6.94 g (0.133 eq) of neopentyl glycol and 8.0 g (0.119 eq) of dimethylol propionic acid. The temperature of the reaction mixture was raised to 120° C. to melt and homogenize the mixture. The reaction mixture was cooled to 90° C. and 70 g (0.627 eq) of IPDI were added in one portion. The reaction was held at 100° C. for two hours when the theoretical NCO of 5.05% was obtained. 48 g of N-methyl pyrolidinone (NMP) were added and, after the temperature was reduced to 45° C., 4.84 g (0.48 eq; 80% of the acid) of triethyl amine were added to neutralize the acid. The neutralized mixture was stirred at 45° C. for ten minutes. The temperature was raised to 60° C. 88.11 g (0.240 eq) of silane aspartate 2 was added. The reaction mixture was held at 60° C. for one hour. 292 g of the prepolymer was added under high shear to 263 g of 60° C. water contained in a resin flask. The high shear was maintained for 30 minutes to yield a dispersion that was stable for at least 4 weeks. The dispersion had a resin solids content of 45% and contained 7.4% NMP.

Coatings prepared from Silane PUD 1

Coated panels were prepared by adding 0.02 parts of dimethyl tin diacetate per 100 parts of silane functional PUD 1. The formulated resin was cast as an 8 mil wet film which resulted in a ~3.5 mil dry film. The coating was allowed to dry at room temperature for thirty minutes and then placed in a 110° C. oven for one hour. The film was clear, glossy and flexible, passed 100 MEK double rubs and demonstrated good hydrolytic stability after overnight immersion in water at room temperature.

Coatings prepared from Silane PUD 1 containing colloidal silica

The preparation of coated panels from PUD 1 was repeated except that the formulated PUD (45% solids) was blended with a colloidal silica dispersion (Ludox AM-30 colloidal silica, 30% solids in water). Ratios of PUD 1 to colloidal silica were varied in increments from 9:1, 8:1, . . . 1:9 wt:wt, based on resin solids. The formulations were cast as 8 mil wet films which resulted in ~3.5 mil dry films. The coatings were allowed to dry at room temperature for thirty minutes and then placed in a 110° C. oven for one hour. Films which had 9:1 or 8:2 ratios of PUD 1 to colloidal silica were glossy and clear; those at 7:3 were glossy, but very slightly hazy; and those with higher ratios of colloidal silica were very hazy. Films at 2:8 and 1:9 ratios of PUD 1 to colloidal silica were brittle and did not form a film. The good films all passed 100 MEK double rubs and demonstrated good hydrolytic stability after being immersed overnight in ambient temperature water.

Preparation of Silane PUD 2

A silane PUD was prepared following the procedure used to prepare silane PUD 1 except that only 10 g of NMP was used, dimethyl ethanol amine (4.26 g, 0.48 eq) was used as the neutralizing amine, and 201 g of 60° C. water was added to the prepolymer to form a stable 40% solids dispersion which contained 2% NMP.

Coatings prepared from Silane PUD 2

Coated panels were prepared by adding 0.35 parts of TEDA catalyst per 100 parts of silane functional PUD 2. The resin was cast as a 5 mil wet film which resulted in a ~2 mil dry film. The coating was allowed to dry at room temperature for thirty minutes and then placed in a 110° C. oven for one hour. Another film was allowed to cure at ambient conditions for two weeks. Both films were clear, glossy and flexible, passed 25 MEK double rubs and demonstrated good hydrolytic stability after overnight immersion in water at room temperature. Additional properties are set forth in Table 1.

Coatings prepared from Silane PUD 2 containing colloidal silica

The preparation of coated panels from PUD 2 was repeated except that the formulated PUD (40% solids) was blended with the colloidal silica dispersion described above. Ratios of PUD 2 to colloidal silica were varied in increments from 9:1, 8:1, . . . 4:6 wt:wt, based on resin solids. The formulations were cast as 5 mil wet films which resulted in ~2 mil dry films. The coatings were allowed to dry at room temperature for thirty minutes and then placed in a 110° C. oven for one hour. Another set of coatings were allowed to cure at ambient conditions. Films which had 9:1 or 6:4 ratios of PUD 2 to colloidal silica were glossy and clear; those at 5:5 were glossy, but very slightly hazy; and those with higher ratios of colloidal silica were very hazy. Films at 4:6 and 3:7 ratios of PUD 2 to colloidal silica were brittle and did not form a film. The good films demonstrated good hydrolytic stability after being immersed overnight in ambient temperature water. Additional properties are set forth in Table 1.

TABLE 1

| PUD 2 weight % | Colloidal Silica weight % | Gloss 60° | Gloss 20° | DOI | Pencil hardness | MEK Double Rubs Passed |
|---|---|---|---|---|---|---|
| 100 | 0  | 95 | 66 | 13 | 2H | 25 |
| 90  | 10 | 86 | 42 | 15 | 2H | 33 |
| 80  | 20 | 88 | 51 | 16 | 2H | 50 |
| 70  | 30 | 87 | 46 | 17 | 2H | >100 |
| 60  | 40 | 75 | 37 | 16 | 3H | >100 |
| 50  | 50 | 83 | 43 | 14 | 3H | >100 |

TABLE 2

| PUD 2 weight % | Colloidal Silica weight % | Gloss 60° | Gloss 20° | DOI | Pencil hardness | MEK Double Rubs Passed |
|---|---|---|---|---|---|---|
| 100 | 0  | 82 | 44 | 12 | 2H | 18 |
| 90  | 10 | 82 | 42 | 10 | 2H | 38 |
| 80  | 20 | 75 | 36 | 9  | 2H | >100 |
| 70  | 30 | 87 | 64 | 14 | H  | >100 |
| 60  | 40 | 71 | 30 | 8  | 2H | >100 |
| 50  | 50 | 70 | 29 | 6  | 2H | >100 |
| 40  | 60 | 65 | 27 | 8  | 2H | >100 |

Gloss was determined in accordance with ASTM D-3363-75.

DOI was determined in accordance with GM 9101P—test for evaluating paint film distinctness of image.

Pencil hardness was determined in accordance with ASTM D-3363-75.

The number of MEK double rubs was determined by wetting a cheesecloth with methyl ethyl ketone and then rubbing each panel. A double rub consists of one back and forth rub against the coated panel.

Preparation of Silane PUD 3

A silane PUD was prepared following the procedure used to prepare silane PUD 1. The procedure for PUD 2 was repeated except that 10 g of tetraethoxysilane was substituted for the 10 g of NMP to form a stable 40% solids dispersion containing no added solvent.

Coatings prepared from Silane PUD 3

Coated panels were prepared by adding 0.35 parts of TEDA catalyst per 100 parts of silane functional PUD 3. The resin was cast as a 5 mil wet film which resulted in a ~2 mil dry film. The coating was allowed to dry at room temperature for thirty minutes and then placed in a 110° C. oven for one hour. The film was clear, glossy and flexible, passed 18 MEK double tubs and demonstrated good hydrolytic stability after overnight immersion in water at room temperature. Additional properties are set forth in Table 2.

Coatings prepared from Silane PUD 3 containing colloidal silica

The preparation of coated panels from PUD 3 was repeated except that the formulated PUD (40% solids) was blended with a colloidal silica dispersion described above. Ratios of PUD 3 to colloidal silica were varied in increments from 9:1, 8:1, . . . 4:6 wt:wt, based on resin solids. The formulations were cast as 5 mil wet films which resulted in ~2 mil dry films. The coatings were allowed to dry at room temperature for thirty minutes and then placed in a 110° C. oven for one hour. Another set of coatings were allowed to cure at ambient conditions. Films which had 9:1 or 6:4 ratios of PUD 3 to colloidal silica were glossy and clear; those at 5:5 were glossy, but very slightly hazy; and those with higher ratios of colloidal silica were very hazy. The good films demonstrated good hydrolytic stability after being immersed overnight in ambient temperature water. Additional properties are set forth in Table 2.

Preparation of Silane PUD 4

A prepolymer was prepared in a 1 liter reaction flask equipped with a heating mantel, condenser, stirring blade, nitrogen inlet and thermometer equipped with the temperature controller. 105.61 g (0.1242 eq.) of polyol 1, 6.99 g (0.1343 eq.) of neopentyl glycol (NPG), 11.25 g (0.1679 eq.) of 2,2'-bis(hydroxymethyl) propionic acid (DMPA), and 30.34 g of N-methylpyrrolidinone (NMP) were mixed together and heated to 80° C. to melt and homogenize the mixture. 55.96 g (0.5037 eq.) of IPDI were added to the mixture in one portion. 0.20 g of dibutyl tin dilaurate were added to the mixture. The mixture was allowed to react at 80° C. for 2 hours. 5.99 g (0.0672 eq.) of triethylamine were added, which is sufficient to neutralize 80% of the acid groups. The neutralized mixture was stirred at 70° C. for 10 min. Then 22.97 g (0.0604 eq.) of the silane aspartate 1 were added and the prepolymer was heated at 80° C. for 15 min.

331.30 g of room temperature water was added to the prepolymer under high shear. The high shear and temperature of 60° C. were maintained for 1 hour to yield a stable translucent dispersion.

The chemical composition and properties of the dispersion are set forth in Table 3.

Preparation of Silane PUD 5

A silane PUD was prepared following the procedure used to prepare silane PUD 4 (with the exception that the silane aspartate was added prior to the neutralizing amine) and using the amounts of ingredients set forth in Table 3. Silane aspartate 2 was used in place of silane aspartate 1. The resulting silane PUD was a white, stable dispersion, which had a higher Si content than silane PUD 4.

The chemical composition and properties of the dispersion are set forth in Table 3.

Preparation of Silane PUD 6

A silane PUD was prepared following the procedure used to prepare silane PUD 5 and using the amounts of ingredients set forth in Table 3. The resulting silane PUD was a white, stable dispersion, which had a higher Si content than silane PUD 4 and silane PUD 5.

The chemical composition and properties of the dispersion are set forth in Table 3.

Preparation of Silane PUD 7—Comparison

A silane PUD was prepared following the procedure used to prepare silane PUD 5 and using the amounts of ingredients set forth in Table 3. A secondary amine, dibutyl amine was used in place of silane aspartate 2. The resulting silane PUD was a white dispersion that precipitated and was not storage stable.

Preparation of Silane PUD 8—Comparison

A silane PUD was prepared following the procedure used to prepare silane PUD 5 with the following exceptions: 1) 3-aminopropyl-trimethoxysilane, which was used to prepare silane aspartate 2, was used in place of silane aspartate 2 and 2) the silane was mixed with water instead of being reacted with the prepolymer before the addition of water. The prepolymer immediately agglomerated upon addition of the mixture of water and silane.

This example demonstrates that higher amounts of silane groups can be incorporated by using the silane aspartates according to the invention than can be incorporated by using the unmodified silane according to the prior art.

TABLE 3

Silane PUD's 4–8 prepared by the direct process

| Ingredients | 4 | 5 | 6 | 7 (Comp) | 8 (Comp) |
|---|---|---|---|---|---|
| IPDI | 55.96 | 55.91 | 58.16 | 55.91 | 55.91 |
| Polyol 1 | 105.61 | 85.55 | 68.23 | 85.55 | 85.55 |
| NPG | 6.99 | 4.72 | 3.63 | 4.72 | 4.72 |
| DMPA | 11.25 | 11.24 | 11.69 | 11.24 | 11.24 |
| DBTDL | 0.20 | 0.16 | — | 0.16 | 0.16 |
| TEA | 6.80 | 6.79 | 7.06 | 6.79 | 6.79 |
| SA 1 | 22.97 | | 66.31 | | |
| SA 2 | | 46.74 | | | |
| DBA | | | | | 16.48 |
| APS | | | | | 22.83 |
| NMP | 30.34 | 30.62 | 31.20 | 34.78 | 27.04 |
| H$_2$O | 331.30 | 254.01 | 253.7 | 219.12 | 236.39 |
| Si Content, % | 0.81 | 1.83 | 2.28 | 0.0 | 1.99 |
| NCO/NH+OH | 1.03 | 1.03 | 1.05 | 1.03 | 1.03 |
| RS, % | 35.0 | 40.0 | 40.0 | 40.0 | 40.0 |
| % NMP on Total Disp | 5.30 | 6.2 | 6.2 | 8.0 | 6.0 |
| % COOH on RS | 1.86 | 1.85 | 1.90 | 2.17 | 2.1 |
| Appearance | Translucent | white | white | white | gelled |
| Viscosity mPa·s at 25° C. | 30.0 | 40.0 | 90.0 | 32.5 | — |
| pH | 7.5 | 7.4 | 7.5 | 7.5 | — |

Preparation of coatings from Silane PUD's 4–7

Two types of coated panels were prepared from each of silane PUD's 4–7 (because it gelled, PUD 8 was not suitable for the preparation of coatings). One set of coatings was cured at 150° C. for 30 minutes, while the other set of coatings was cured at room temperature. In each set the resins were cast as a 5 mil wet film which resulted in a ~2 mil dry film. Each set of resins contained 4 different coating compositions.

Composition 1 contained the silane PUD mixed with 0.75%, based on resin solids, of ammonium hydroxide.

Composition 2 contained the silane PUD mixed with 1.0%, based on resin solids (0.3% solids on solids), of TEDA.

Composition 3 contained 30%, based on the PUD, of the colloidal silica described previously.

Composition 4 contained both ammonium hydroxide and colloidal silica in the amounts previously set forth.

After the coatings were prepared, they were tested for MEK double rubs. The results are set forth in Table 4.

TABLE 4

MEK Double Rubs - Coatings Prepared from Silane PUD

| | 4 | 5 | 5 | 7 (Comp) |
|---|---|---|---|---|
| Curing conditions 105° C., 30 min | | | | |
| Comp 1 | 35 | 100 | 100 | 0 |
| Comp 2 | 25 | 90 | 100 | 20 |
| Comp 3 | 26 | 100 | — | 0 |
| Comp 4 | 100 | 100 | 100 | 0 |
| Air Dried | | | | |

TABLE 4-continued

MEK Double Rubs - Coatings Prepared from Silane PUD

| | | | | |
|---|---|---|---|---|
| Comp 1 | | | | |
| 1 week | 6 | 4 | 3 | 5 |
| 2 weeks | 10 | 10 | 5 | 10 |
| 6 weeks | 17 | 4 | 15 | 10 |
| Comp 2 | | | | |
| 1 week | 8 | 8 | 14 | 0 |
| 2 weeks | 8 | 10 | 10 | 0 |
| 6 weeks | 8 | 15 | 10 | 0 |
| Comp 3 | | | | |
| 1 week | 10 | 6 | 10 | 2 |
| 2 weeks | 10 | 10 | 15 | 2 |
| 6 weeks | 10 | 15 | 8 | 30 |
| Comp 4 | | | | |
| 1 week | 7 | 13 | 20 | 0 |
| 2 weeks | 20 | 10 | 10 | 0 |
| 6 weeks | 55 | 25 | 10 | 0 |

A comparison between the coatings prepared from the silane aspartates according to the invention and the coatings prepared from silane PUD 7, which did not contain silane groups, demonstrates the need for these groups to obtain good solvent resistance.

Preparation of Silane PUD 9

A silane PUD was prepared following the procedure used to prepare silane PUD 5 and using the amounts of ingredients set forth in Table 5. Polyol 2, which has a lower molecular weight, was used in place of polyol 1. The resulting silane PUD was a translucent, stable dispersion.

The chemical composition and properties of the dispersion are set forth in Table 5.

Preparation of Silane PUD 10

A silane PUD was prepared following the procedure used to prepare silane PUD 5 and using the amounts of ingredients set forth in Table 5. Methyl ethyl ketone was used as a solvent and the amount of NMP was decreased to the amount needed to dissolve the acid component. MEK was removed by vacuum distillation after the dispersion step was complete resulting in a translucent, stable dispersion.

The chemical composition and properties of the dispersion are set forth in Table 5.

Preparation of Silane PUD 11

A silane PUD was prepared following the procedure used to prepare silane PUD 5 and using the amounts of ingredients set forth in Table 5. HDI was used in place of IPDI. The resulting silane PUD was a translucent dispersion, which slightly separated after 1 week.

The chemical composition and properties of the dispersion are set forth in Table 5.

Preparation of Silane PUD 12

A silane PUD was prepared following the procedure used to prepare silane PUD 5 and using the amounts of ingredients set forth in Table 5. Ethylene diamine was used as the chain extender. The resulting silane PUD was a translucent, stable dispersion.

The chemical composition and properties of the dispersion are set forth in Table 5.

Preparation of Silane PUD 13

A silane PUD was prepared following the procedure used to prepare silane PUD 12 and using the amounts of ingredients set forth in Table 5. Silane aspartate 2 was used in place of silane aspartate 1. The resulting silane PUD was a translucent, stable dispersion.

The chemical composition and properties of the dispersion are set forth in Table 5.

TABLE 5

Silane PUD's 9–14 prepared by the direct process

| Ingredients | 9 | 10 | 11 | 12 | 13 |
|---|---|---|---|---|---|
| IPDI | 73.44 | 50.86 | | 48.71 | 48.90 |
| HDI | | | 26.52 | | |
| Polyol 1 | | 85.55 | 68.23 | 85.55 | 85.55 |
| Polyol 2 | 77.73 | | | | |
| NPG | 7.57 | 6.36 | 3.62 | | |
| EDA | | | | 3.95 | 3.97 |
| DMPA | 14.76 | 10.22 | 7.05 | 9.79 | 9.83 |
| DBTDL | — | 0.16 | — | — | 0.18 |
| TEA | 8.92 | 6.18 | 4.26 | 5.91 | 5.94 |
| SA 1 | 30.14 | 20.87 | 14.4 | 19.99 | |
| SA 2 | | | | | 19.37 |
| NMP | 30.55 | 9.21 | 19.01 | 26.61 | 26.62 |
| MEK | | 45.44 | | | |
| $H_2O$ | 328.31 | 254.72 | 349.99 | 290.05 | 373.17 |
| Si Content, % | 1.06 | 0.81 | 0.81 | 0.80 | 0.87 |
| NCO/NH+OH | 1.05 | 1.03 | 1.05 | 1.00 | 1.00 |
| RS, % | 35.0 | 40.0 | 25.0 | 35.0 | 30.0 |
| % NMP on Total Disp | 5.30 | 2.03 | 3.80 | 5.30 | 4.60 |
| % COOH on RS | 2.40 | 1.86 | 1.87 | 1.85 | 1.86 |
| Appearance | trans-lucent | trans-lucent | trans-lucent | trans-parent | trans-lucent |
| Viscosity mpa·s at 25° C. | 102.5 | 112.5 | 62.5 | 69 | 207 |
| pH | 7.3 | 7.5 | 7.2 | 9.7 | 9.7 |

Preparation of coatings from Silane PUD's 9–13

Coatings were prepared from silane PUD's 9–13 following the procedure set forth for silane PUD's 4–7. The results of the MEK double rubs tests were similar to those obtained for PUD's 4–6.

Preparation of Silane PUD 14

A silane PUD was prepared following the procedure used to prepare silane PUD 5 and using the amounts of ingredients set forth in Table 6. Silane aspartate 2 was used in place of silane aspartate 1. The resulting silane PUD was a translucent, stable dispersion.

The chemical composition and properties of the dispersion are set forth in Table 6.

Preparation of Silane PUD 15

A silane PUD was prepared following the procedure used to prepare silane PUD 14 and using the amounts of ingredients set forth in Table 6. A mixture of IPDI and polyisocyanate 1, a trifunctional isocyanate, was used in this example. The resulting silane PUD was a translucent, stable dispersion.

The chemical composition and properties of the dispersion are set forth in Table 6.

Preparation of Silane PUD 16

A silane PUD was prepared following the procedure used to prepare silane PUD 14 and using the amounts of ingredients set forth in Table 6. Butane diol was used as the chain extender. The resulting silane PUD was a translucent, stable dispersion. The chemical composition and properties of the dispersion are set forth in Table 6.

Preparation of Silane PUD 17

A silane PUD containing cationic groups was prepared following the procedure used to prepare silane PUD 14 and using the amounts of ingredients set forth in Table 6. Methyldiethanolamine was used to provide the cationic groups. The resulting silane PUD was a white, stable dispersion.

The chemical composition and properties of the dispersion are set forth in Table 6.

Preparation of Silane PUD 18

A non-ionic prepolymer was prepared by mixing 45.86 g of IPDI with 68.11 g of a hydrophilic monoalcohol (a polyether monoalcohol prepared by the ethoxylation of methanol and having a number average molecular weight of 550) in a 1 liter reaction flask equipped with a heating mantel, condenser, stirring blade, nitrogen inlet and thermocouple. 0.22 parts of dibutyl tin dilaurate were added to the mixture and the contents of the flask were heated at 90° C. for 1.5 hours. 98.37 g of silane aspartate 2 were then added to the mixture at 80° C. and allowed to react for 10 min. 287.66 g of room temperature water was added to the prepolymer under high shear. A white, stable dispersion was obtained.

The chemical composition and properties of the dispersion are set forth in Table 6.

Preparation of Silane PUD 19

A silane PUD was prepared following the procedure used to prepare silane PUD 14 and using the amounts of ingredients set forth in Table 6. Polyol 2 was used instead of polyol 1, tetraethyoxysilane was used as a reactive diluent and the amount of NMP was decreased. The resulting silane PUD was a white, stable dispersion.

The chemical composition and properties of the dispersion are set forth in Table 6.

TABLE 6

Silane PUD's 14–18 prepared by the direct process

| Ingredients | 14 | 15 | 16 | 17 | 18 | 19 |
|---|---|---|---|---|---|---|
| IPDI | 55.96 | 46.09 | 56.46 | 53.75 | 45.86 | 73.4 |
| Polyiso 1 | | 13.15 | | | | |
| Polyol 1 | 105.6 | 105.8 | 106.5 | 104.2 | | |
| Polyol 2 | | | | | | 77.7 |
| Monool 2 | | | | | 68.11 | |
| NPG | 6.99 | 6.31 | | 6.55 | | |
| BDO | | | 6.10 | | | 6.54 |
| DMPA | 11.25 | 10.26 | 11.35 | | | 14.75 |
| MDEA | | | | 9.22 | | |
| DBTDL | 0.19 | 0.19 | — | 0.16 | 0.22 | 0.16 |
| TEA | 6.80 | 6.14 | 6.86 | | | 8.91 |
| Acetic acid | | | | 23.87 | | |
| SA 2 | 22.16 | 21.06 | 22.36 | 21.28 | 98.37 | 29.07 |
| NMP | 30.34 | 30.40 | 30.42 | 29.25 | — | 23.21 |
| TEOS | — | — | — | — | — | 30.53 |
| $H_2O$ | 260.7 | 260.8 | 259.9 | 251.9 | 287.7 | 235.9 |
| Si Content, % | 0.88 | 0.83 | 0.85 | 0.87 | 3.70 | 1.15 |
| NCO/NH+OH | 1.03 | 1.05 | 1.03 | 1.05 | 1.05 | 1.05 |
| RS, % | 40.0 | 40.0 | 40.0 | 40.0 | 40.0 | 40.0 |
| % NMP on Total Disp | 6.08 | 6.07 | 6.08 | 6.08 | — | |
| % COOH on RS | 1.87 | 1.70 | 1.88 | | — | 4.60 |
| % N on RS | | | | 0.56 | — | |
| Appearance | trans-lucent | trans-lucent | trans-lucent | white | white | white |
| Viscosity mPa·s at 25° C. | 215 | 345 | 57 | 375 | 22.5 | 65 |
| pH | 7.4 | 7.3 | 7.3 | 4.3 | 7.4 | 7.0 |

Preparation of coatings from Silane PUD's 14–19

Coatings were prepared from silane PUD's 14–19 following the procedure set forth for silane PUD's 4–7. The results of the MEK double rubs tests were similar to those obtained for the preceding PUD's.

Preparation of Silane PUD 20

A silane PUD was prepared following the procedure used to prepare silane PUD 14 and using the amounts of ingredients set forth in Table 7. The resulting silane PUD was a white, stable dispersion, which had a higher Si content than silane PUD 14.

The chemical composition and properties of the dispersion are set forth in Table 7.

Preparation of Silane PUD 21

A silane PUD was prepared following the procedure used to prepare silane PUD 9 and using the amounts of ingredients set forth in Table 7. Silane aspartate 2 was used in place of silane aspartate 1. The resulting silane PUD was a translucent, stable dispersion.

The chemical composition and properties of the dispersion are set forth in Table 7.

The chemical composition, properties of the dispersion, and solvent resistance of the resulting coatings are set forth in Table 1.

Preparation of Silane PUD 22

A silane PUD was prepared following the procedure used to prepare silane PUD 21 and using the amounts of ingredients set forth in Table 7. 5 times the amount of catalyst was used in this example. The resulting silane PUD was a translucent, stable dispersion.

The chemical composition and properties of the dispersion are set forth in Table 7.

Preparation of Silane PUD 23

A silane PUD was prepared following the procedure used to prepare silane PUD 5 and using the amounts of ingredients set forth in Table 1. Polyol 3 was used in place of polyol 1. The resulting silane PUD was a white, stable dispersion.

The chemical composition and properties of the dispersion are set forth in Table 7.

Preparation of Silane PUD 24

A silane PUD was prepared following the procedure used to prepare silane PUD 5 and using the amounts of ingredients set forth in Table 7. Polyol 5 was used in place of polyol 1. The resulting silane PUD was a white, stable dispersion.

The chemical composition and properties of the dispersion are set forth in Table 7.

Preparation of Silane PUD 25

A silane PUD was prepared following the procedure used to prepare silane PUD 5 using the amounts of ingredients set forth in Table 7. Polyol 6 was used in place of polyol 1. The resulting PUD was a white, stable dispersion.

The chemical composition and properties of the dispersion are set forth in Table 7.

TABLE 7

Silane PUD's 20–25 prepared by the direct process

| Ingredients | 20 | 21 | 22 | 23 | 24 | 25 |
| --- | --- | --- | --- | --- | --- | --- |
| IPDI | 56.22 | 73.83 | 73.85 | 55.91 | 66.43 | 57.92 |
| Polyol 1 | 80.29 | | | | | |
| Polyol 2 | | 78.14 | 78.14 | | | |
| Polyol 3 | | | | 51.13 | | |
| Polyol 5 | | | | | 67.67 | |
| Polyol 6 | | | | | | 87.04 |
| NPG | 3.51 | 7.62 | 7.62 | 4.72 | 6.64 | |
| BDO | | | | | | 4.53 |
| DMPA | 11.3 | 14.84 | 14.84 | 11.24 | 10.68 | 8.73 |
| DBTDL | 0.15 | 0.17 | 0.87 | 0.16 | 0.15 | 0.16 |
| TEA | 6.83 | 8.97 | 8.97 | 6.79 | 8.07 | 8.79 |
| SA 2 | 55.66 | 29.24 | 29.24 | 46.74 | 55.54 | 47.78 |
| NMP | 31.05 | 30.55 | 40.73 | 30.62 | 31.04 | 41.2 |
| $H_2O$ | 255.0 | 328.1 | 245.8 | 254.0 | 253.8 | 243.9 |
| Si Content, % | 2.15 | 1.15 | 1.15 | 2.20 | 0.86 | 1.86 |
| NCO/NH+OH | 1.05 | 1.05 | 1.05 | 1.03 | 1.03 | 1.2 |
| RS, % | 40.0 | 35.0 | 40.0 | 40.0 | 40.0 | 40.0 |
| % NMP on Total Disp | 6.20 | 5.30 | 8.10 | 6.20 | 6.20 | 8.20 |
| % COOH on RS | 1.83 | 2.40 | 2.40 | 2.20 | 1.73 | 1.42 |
| Appearance | white | translucent | translucent | white | white | white |
| Viscosity mPa·s at 25° C. | 345 | 60 | 125 | 30 | 58 | 102 |
| pH | 6.3 | 7.3 | 7.3 | 7.9 | 7.8 | 7.7 |

Preparation of coatings from Silane PUD's 20–25

Coatings were prepared from silane PUD's 20–25 following the procedure set forth for silane PUD's 4–7. The results of the MEK double rubs tests were similar to those obtained for the preceding PUD's.

Silane PUD 26—Comparison

Example 1 of U.S. Pat. No. 5,554,686 was repeated. A prepolymer was prepared in a 1 liter reaction flask equipped with a heating mantel, condenser, stirring blade, nitrogen inlet and thermometer equipped with a temperature controller. 308.23 g (2.3351 eq.) of 4,4'-cyclohexylmethane diisocyanate (HMDI), 360.72 g (0.5787 eq.) of Polyol 4, 40.10 g (0.5976 eq.) of DMPA and 125.10 g of NMP were heated with stirring to 40° C. to 50° C. 0.081 g of dibutyl tin dilaurate were added and the mixture was heated to 80° C. and allowed to react for 2 hours.

A premix was prepared from 325.00 g of distilled water, 5.28 g of triethylamine (TEA), 6.00 g (0.1997 eq.) of EDA and 6.00 g (0.0335 eq.) of 3-aminopropyltrimethoxysilane.

170.15 g (0.2363 eq.) of the prepolymer was added over 10 minutes to the premix solution in a reaction flask under high shear. A white, stable dispersion was formed.

The chemical composition and properties of the dispersion are set forth in Table 8.

Preparation of Silane PUD 27

A silane PUD was prepared following the procedure used to prepare silane PUD 14 and using the amounts of ingredients set forth in Table 8 with the exception that the prepolymer was made by the inverse process by adding the prepolymer to water instead of adding water to the prepolymer. The prepolymer was prepared from all of the reactive ingredients except EDA. EDA was mixed with water at room temperature and then the prepolymer at 80° C. was added into the water/EDA mixture in one portion at high shear. The high shear and temperature of 60° C. was maintained for 1 hour to yield a stable, white dispersion.

The chemical composition and properties of the dispersion are set forth in Table 8.

Preparation of Silane PUD 28

A silane PUD was prepared following the procedure used to prepare silane PUD 27 and using the amounts of ingredients set forth in Table 8. HMDI was used instead of IPDI. EDA and hydrazine hydrate were added to the water phase. The resulting silane PUD was a translucent, stable dispersion.

The chemical composition and properties of the dispersion are set forth in Table 8.

Preparation of Silane PUD 29

A silane PUD was prepared following the procedure used to prepare silane PUD 28 and using the amounts of ingredients set forth in Table 1. Diethyltriamine (DETA) and hydrazine hydrate were added to the water phase. The resulting silane PUD was a translucent, stable dispersion.

The chemical composition and properties of the dispersion are set forth in Table 8.

Preparation of Silane PUD 30—Comparison

A silane PUD was prepared following the procedure used to prepare silane PUD 8 and using the amounts of ingredients set forth in Table 8, except that the prepolymer was added to the mixture of water and silane instead of adding this mixture to the prepolymer. After the addition of the prepolymer to water, the mixture gelled.

This example demonstrates that even when silane PUD 8 was prepared using the inverse process disclosed in U.S. Pat. No. 5,554,686, a gelled product is obtained.

The chemical composition and properties of the dispersion are set forth in Table 8.

TABLE 8

Silane PUD's 26–30 prepared by the inverse process

| Ingredients | 26 (Comp) | 27 | 28 | 29 | 30 (Comp) |
|---|---|---|---|---|---|
| IPDI | | 72.09 | | | 55.91 |
| HMDI | 64.72 | | 92.06 | 43.17 | |
| Polyol 1 | | 93.6 | 118.57 | 55.59 | 85.55 |
| Polyol 4 | 75.74 | | | | |
| NPG | | | | 2.27 | 4.72 |
| EDA | 6.00 | 7.15 | 3.63 | | |
| HH | | | 3.81 | 1.08 | |
| DETA | | | | 0.53 | |
| DMPA | 8.42 | 9.97 | 13.4 | 6.28 | 11.24 |
| DBTDL | 0.02 | — | 0.20 | 0.11 | — |
| TEA | 5.28 | 6.02 | 10.12 | 4.74 | 6.79 |
| SA 1 | | 19.64 | 30.69 | 18.39 | |
| APS | 6.00 | | | | 13.82 |
| NMP | 26.27 | 40.49 | 39.57 | 34.34 | 36.05 |
| H$_2$O | 325.0 | 251.0 | 819.7 | 333.6 | 205.0 |
| Si Content, % | 0.58 | 0.78 | 0.93 | 1.16 | 1.27 |
| NCO/NH+OH | 1.02 | 1.20 | 1.00 | 1.05 | 1.15 |
| RS, % | 32.0 | 40.0 | 23.3 | 25.0 | 40.0 |
| % NMP on Total Disp | 5.10 | 8.10 | 3.50 | 3.75 | 8.60 |
| % COOH on RS | 1.80 | 1.65 | 1.70 | 1.66 | 2.20 |
| Appearance | white | white | translucent | translucent | gelled |
| Viscosity mPa·s at 25° C. | 22.5 | 27.5 | 177 | 15 | — |
| pH | 8.0 | 7.2 | 9.6 | 7.7 | — |

Preparation of coatings from Silane PUD's 26–29

Coatings were prepared from silane PUD's 26–29 following the procedure set forth for silane PUD's 4–7 (because it gelled, PUD 30 was not suitable for the preparation of coatings). After the coatings were prepared, they were tested for MEK double rubs. The results are set forth in Table 9.

TABLE 9

MEK Double Rubs - Coatings Prepared from Silane PUD

| Curing Conditions 105° C., 30 min | 26 (Comp) | 27 | 28 | 29 |
|---|---|---|---|---|
| Comp 1 | 100 | 60 | 100 | 100 |
| Comp 2 | 100 | 50 | 100 | 100 |
| Comp 3 | 100 | 40 | 100 | 100 |
| Comp 4 | 100 | 40 | 100 | 100 |
| Air Dried | | | | |
| Comp 1 | | | | |
| 1 week | 18 | 14 | 10 | 4 |
| 2 weeks | 50 | 50 | 25 | 8 |
| 6 weeks | 33 | 50 | 10 | 6 |
| Comp 2 | | | | |
| 1 week | 50 | 30 | 30 | 6 |
| 2 weeks | 50 | 20 | 30 | 50 |
| 3 weeks | 70 | 60 | 50 | 50 |
| Comp 3 | | | | |
| 1 week | 20 | 20 | 20 | 5 |
| 2 weeks | 20 | 30 | 20 | 15 |
| 3 weeks | 40 | 28 | 60 | 30 |
| Comp 4 | | | | |
| 1 week | 50 | 30 | 35 | 15 |
| 2 weeks | 30 | 20 | 20 | 10 |
| 3 weeks | 60 | 30 | 75 | 10 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane/urea dispersion wherein the polyurethane/ureas contain 0.5 to 6% by weight, based on the weight of the polyurethane/ureas, of alkoxysilane groups (calculated as Si, MW 28), which have been incorporated by the reaction of isocyanate groups with compounds containing alkoxysilane groups and aspartate groups.

2. The dispersion of claim 1 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

3. The dispersion of claim 2 wherein at least about 80% of said anionic groups are carboxylate groups neutralized with tertiary amines.

4. The dispersion of claim 1 wherein said polyurethane/ureas contain 10 to 120 milliequivalents per 100 grams of polyurethane/ureas of chemically incorporated cationic groups and up to about 10% by weight, based on the weight of said polyurethane/ureas, of lateral and/or terminal hydrophilic chains containing ethylene oxide units.

5. A process for the preparation of an aqueous polyurethane/urea dispersion by

A) preparing an NCO prepolymers by reacting an organic polyisocyanate with a high molecular weight polyol, optionally a low molecular weight isocyanate-reactive compound and optionally an isocyanate-reactive compound containing hydrophilic groups and B) reacting the NCO prepolymer with a compound containing alkoxysilane groups and aspartate groups and optionally other amine chain extenders either prior to, during or after dispersing the NCO prepolymer in water, wherein the compound containing alkoxysilane groups and aspartate groups is present in an amount sufficient to incorporate 0.5 to 6% by weight, based on the weight of the polyurethane/ureas, of alkoxysilane groups (calculated as Si, MW 28).

6. The process of claim 5 wherein the isocyanate-reactive compound containing hydrophilic groups is present in an amount such that said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

7. The process of claim 6 wherein at least about 80% of said anionic groups are carboxylate groups neutralized with tertiary amines.

8. The process of claim 5 wherein the isocyanate-reactive compound containing hydrophilic groups is present in an amount such that said polyurethane/ureas contain 10 to 120 milliequivalents, per 100 grams of polyurethane/ureas, of chemically incorporated cationic groups and up to about 10% by weight, based on the weight of said polyurethane/ureas, of lateral and/or terminal hydrophilic chains containing ethylene oxide units.

9. A coating prepared from the aqueous polyurethane/urea dispersion of claim 1.

* * * * *